June 16, 1936.   C. E. PETERSON   2,044,748
MACHINE FOR MAKING CONFECTIONS
Filed Feb. 3, 1934   5 Sheets-Sheet 2

INVENTOR
Conrad E. Peterson,
BY
J.H.M Cready,
his ATTORNEY.

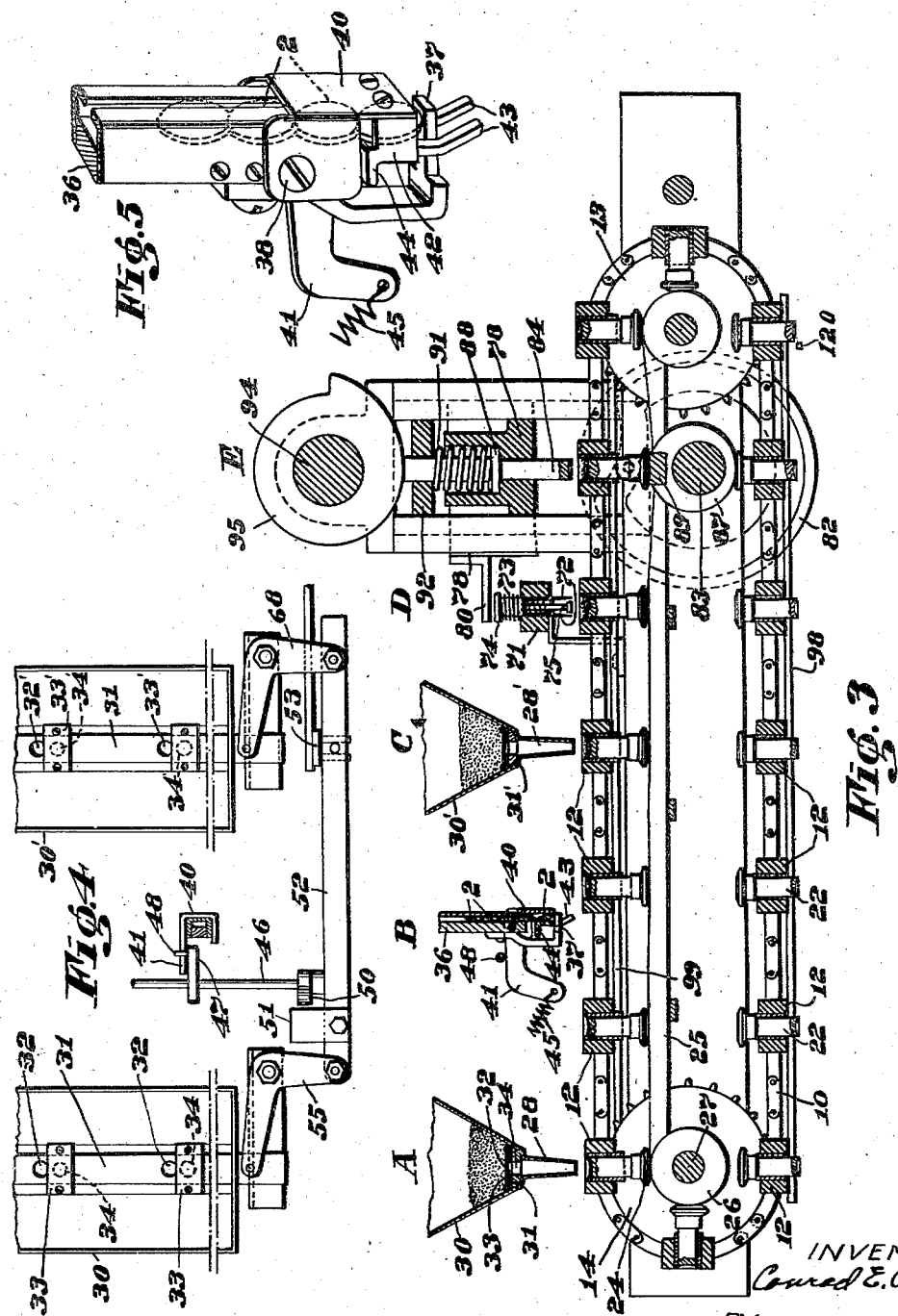

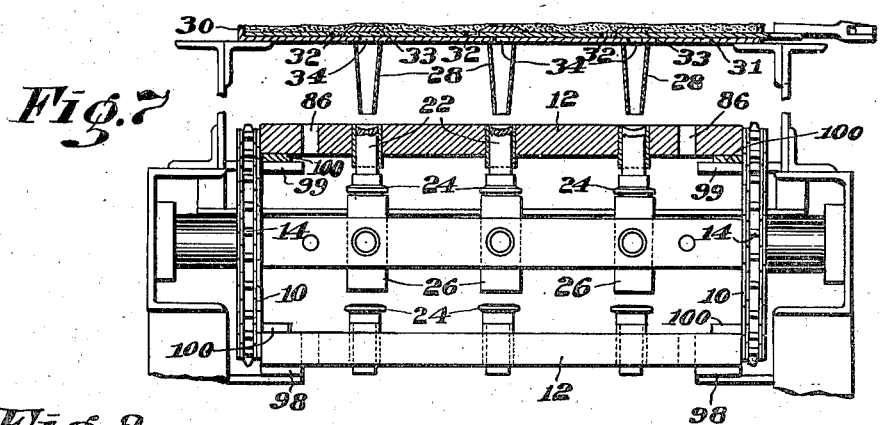
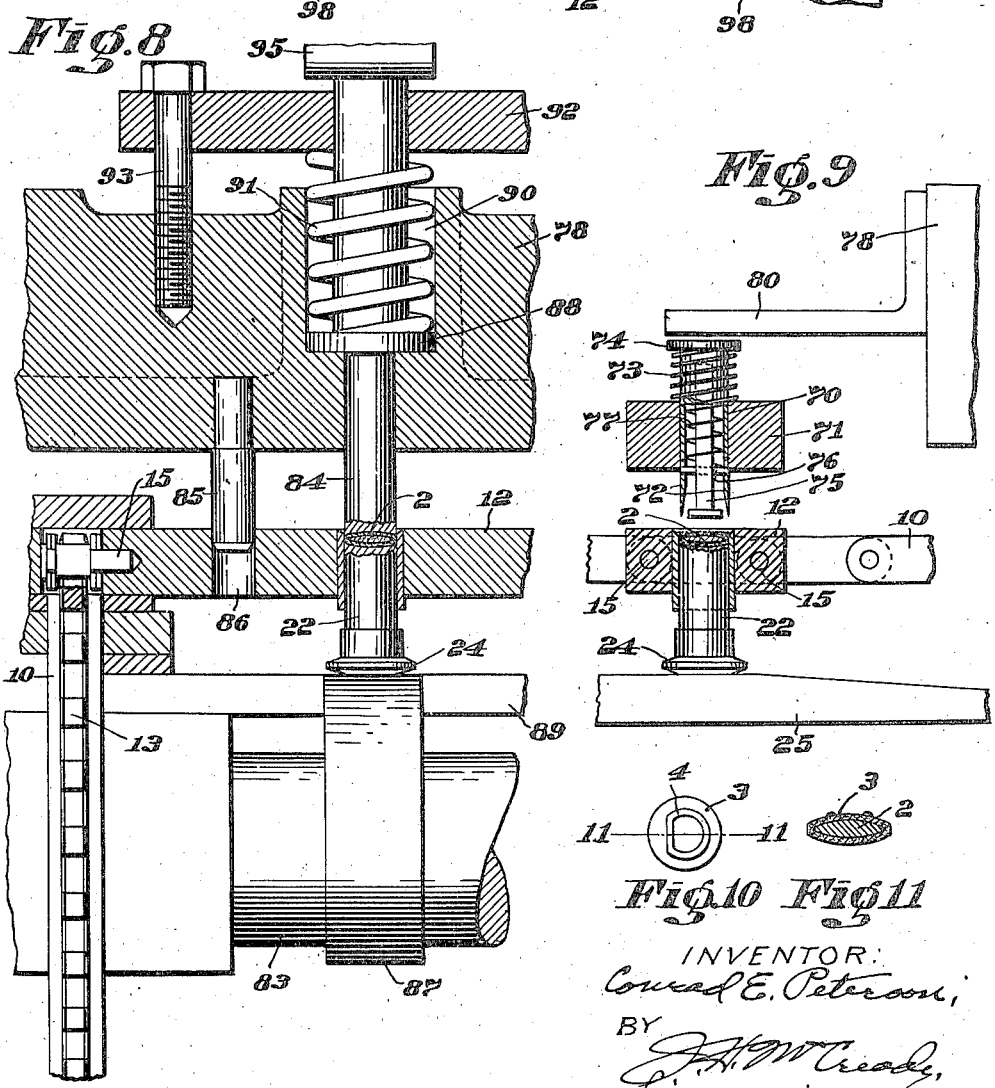

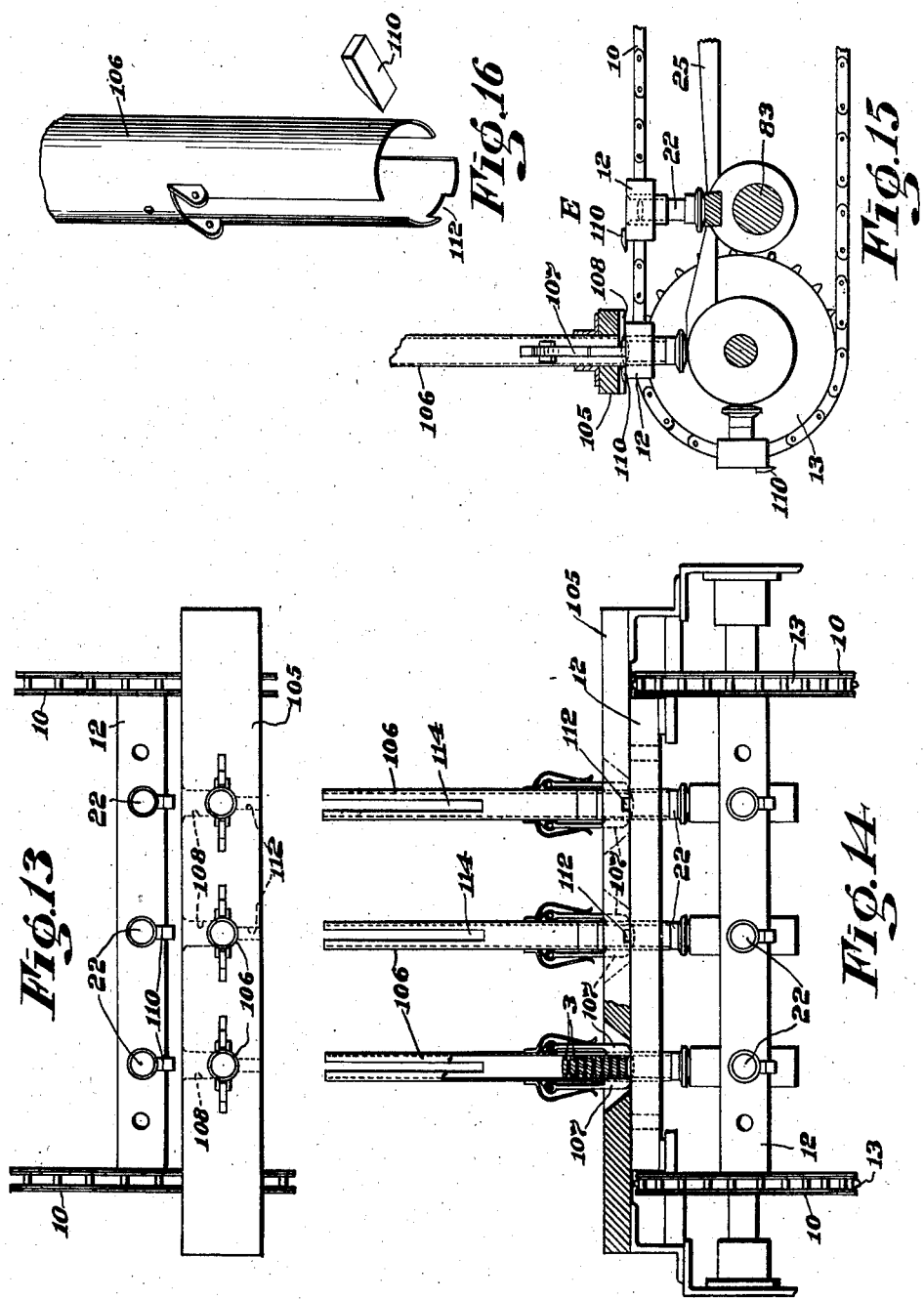

Patented June 16, 1936

2,044,748

UNITED STATES PATENT OFFICE 2,044,748

MACHINE FOR MAKING CONFECTIONS

Conrad E. Peterson, Malden, Mass., assignor to De Long Gum Co., South Boston, Mass., a corporation of Massachusetts Application February 3, 1934, Serial No. 709,637

19 Claims. (Cl. 107—1)

This invention relates to machines for making confections of the type in which chewing gum forms the predominating, or at least an important, constituent.

At the present time chewing gum is marketed chiefly in two forms, one consisting of a flat stick or slab dusted with powdered sugar, and the other of a tablet comprising a chewing gum center or core encased in a shell of crystallized sugar. Of these two forms, the former is by far the more common. The chief objection to it is that it must be protected by careful and relatively expensive wrapping in order to prevent the gum from becoming hard, brittle, and unfit for use. In fact, notwithstanding such wrapping, a slow deterioration of the gum occurs which makes it necessary for the manufacturers to collect the old stock after it has been in the hands of the distributors for a certain length of time, and to replace it with fresh material. A more effective protection for the gum is provided by the crystallized sugar shell of the tablet form, but this is open to the objection that the expense of manufacture is relatively high since the sugar coating must be applied to the chewing gum cores in the form of a syrup from which the water constituent later is evaporated and the coating operation repeated until a shell or casing of adequate thickness to protect the core is built up. In addition, many chewing gum users find this form of confection unpleasant for the reason that when one or two of these tablets are first placed in the mouth and the encasing shell of sugar is broken, it fractures into hard, brittle fragments which present a disagreeable gritty feel between the teeth.

The present invention aims to devise a machine for making chewing gum confections of the tablet form which will combine the advantage of the two common commercial forms above described, while avoiding the objectionable features of both. It is also an object of the invention to provide a machine of this character that will be extremely economical of labor, will have a high rate of production, and which can be used in the manufacture of other confections of the tablet type.

The nature of the invention will be readily understood from the following description when read in connection with the accompanying drawings, and the novel features will be particularly pointed out in the appended claims.

In the drawings,

Fig. 3 is a longitudinal, vertical, sectional view of said machine;

Fig. 4 is a plan view of certain parts of the machine illustrated in Figs. 1, 2 and 3;

Fig. 5 is a perspective view of a portion of the mechanism for feeding the chewing gum centers;

Fig. 6 is a plan view of one of the cams;

Fig. 7 is a rear elevation of the conveyor, and also shows certain details of the machine in section;

Fig. 8 is a vertical, sectional view through parts of the machine illustrating the mold and adjacent parts during the compressing step;

Fig. 9 is a vertical, sectional view, partly in elevation, showing the mechanism for centering the chewing gum cores;

Figs. 10 and 11 are plan and sectional views, respectively, of a chewing gum tablet which this machine is particularly designed to make;

Fig. 13 is a plan view of a stacker showing it in cooperative relationship to the conveyor and the mold bars carried thereby;

Fig. 14 is a front elevation, partly in vertical section, of the apparatus illustrated in Fig. 13;

Fig. 15 is a side view, partly in vertical section, of the mechanism illustrated in Fig. 14; and Fig. 16 is a perspective view of one of the stacker tubes and the wedge which performs an important function in the stacking operation.

Figure 1:
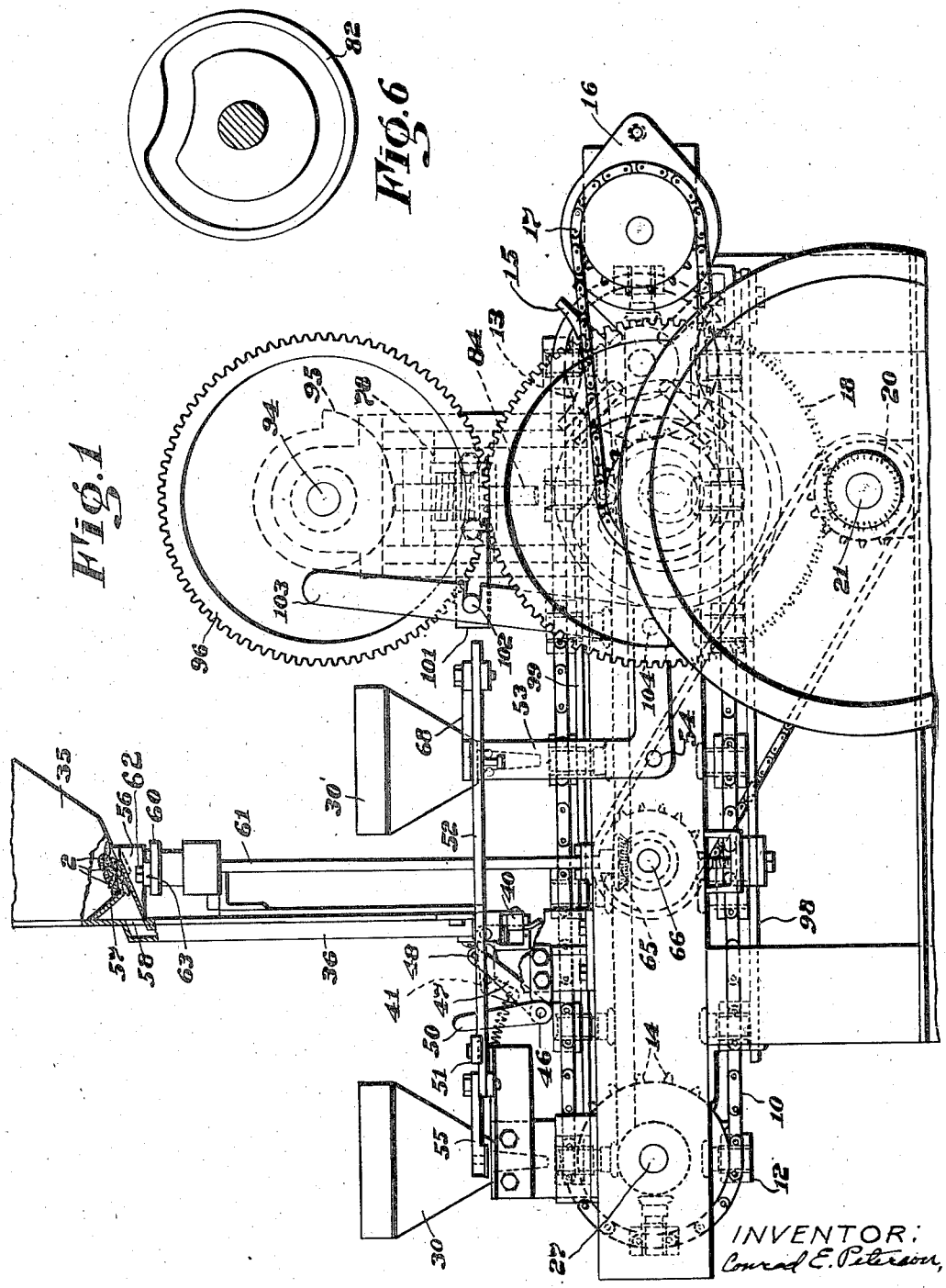
Figure 1 is a side elevation of a machine constructed in accordance with this invention, certain of the parts being broken away.

The machine shown in the drawings is designed especially for the purpose of making chewing gum tablets in accordance with a method disclosed in a pending application previously filed by me. It is contemplated, however, that essential features of the machine can also be used in the manufacture of other confections. The method of making chewing gum tablets disclosed in my earlier application comprises the steps of surrounding a chewing gum core with a body of powdered sugar, and then compressing the assembly so produced to consolidate the sugar and thus form a hard shell completely enclosing and protecting the core. Such a product is illustrated in Figs. 10 and 11, the chewing gum core being shown at 2 and the protecting shell of sugar at 3. The cores may take a great variety of forms and shapes. A very convenient shape, however, consists of a disk-like body having convex upper and lower surfaces, and such cores may conveniently be produced in a machine described and claimed in another pending application filed by me, or they may be made in any other convenient manner.

Figure 2:
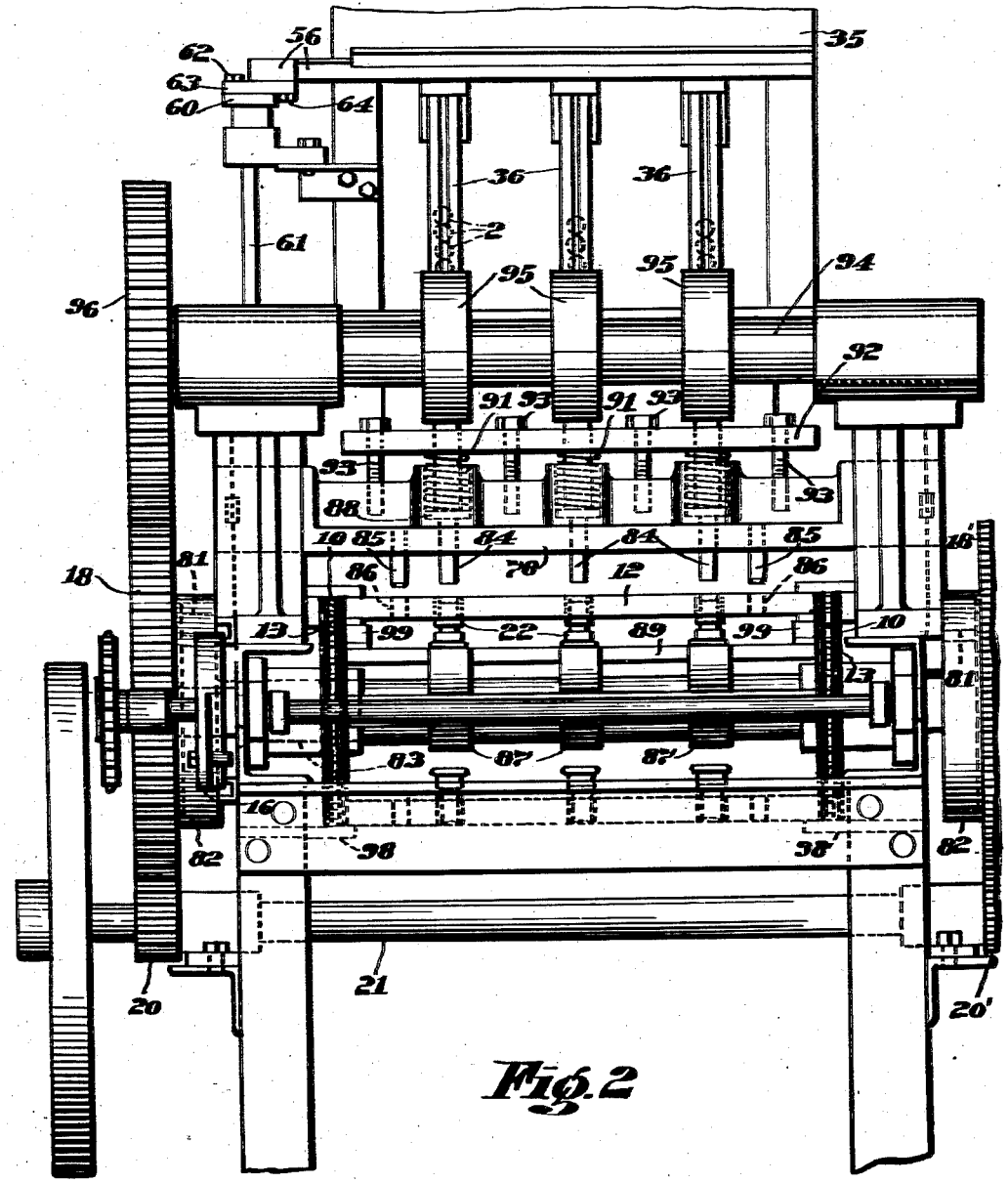
Fig. 2 is a front elevation of the machine shown in Fig. 1.

Referring more particularly to Figs. 1 and 3, it will be seen that the machine there shown comprises a chain conveyor 10, carrying a series of mold bars 12, each of which is provided with a plurality of mold or die cavities, three such cavities being formed in each bar, in the particular arrangement here shown, as illustrated in Figs. 2 and 7. A driving mechanism for the conveyor moves it intermittently to carry the successive mold bars past five stations, indicated in Fig. 3 at A, B, C, D and E, respectively. At the first of these stations a charge of powdered sugar is deposited in each die or mold; a chewing gum core is placed on the charge of sugar in each mold at the second station; at the third station an additional charge of sugar is deposited in the mold; the chewing gum core is then centered laterally in the mold at the fourth station, and at the last station the entire charge in each mold is compressed.

The conveyor comprises two chains mounted at opposite sides of the machine and supported at their forward ends on sprocket wheels 13—13 and at their rearward ends on additional sprocket wheels 14—14. Each mold bar 12 is provided with holes in the ends thereof to receive loosely pins 15—15, Figs. 8 and 9, these pins being carried by the chain and serving to removably support the bars on the chain.

Figure 12:
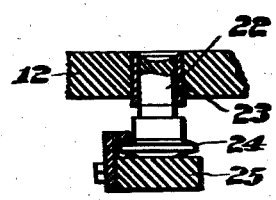
Fig. 12 is a sectional view through one of the molds and adjacent parts.

Any suitable form of intermittent drive may be provided for operating the conveyor chain, that shown consisting of a Geneva movement comprising a Geneva wheel 15, Fig. 1, and a Geneva driver 16 for said wheel. The driver is driven through a chain 17 from a sprocket wheel secured to the side of the gear 18 which meshes with, and is driven by, a pinion 20 fast on the main shaft 21 of the machine. Consequently, the continuous rotative movement of the main shaft results in giving the conveyor intermittent feeding movements, the length of each movement being equal to the distance between the centers of adjacent mold bars. As shown, for example, in Figs. 7 and 12, each mold includes a plunger 22 fitting snugly in the mold cavity and having an upper face shaped to a form complemental to that to be given to the surface of the tablet or other molded body to be made. It is preferable to make the bars 12 of an aluminum alloy, or some other light weight metal, and to secure bushings, such as that shown at 23 in Fig. 12, of steel, or other hard material, in the bars to form the walls of the respective molds. Each plunger 22 is provided with an enlargement or head 24 which runs on a track or rail 25 extending longitudinally of the machine.

As the bars are brought successively to the station A, Fig. 3, where the molds receive the first charge of sugar, the heads 24 of the plungers 22 ride on to the surfaces of collars 26, respectively, Figs. 3 and 7, secured fast on a shaft 27 of the rear sprocket wheels 14 which support the conveyor chains 10, these collars being made of such diameter that they support the plungers at the proper elevations for receiving the first charge. At the station A each bar 12 stops with its molds in register with the discharge chutes 28, respectively, Figs. 3 and 7, leading from the bottom of a hopper 30 which holds a supply of powdered sugar. While the molds rest in this position the sugar handling mechanism delivers a measured quantity of sugar to each discharge chute which guides it into the mold in register with it. The measuring mechanism comprises a bar 31, Figs. 4 and 7, mounted to reciprocate in the bottom of the hopper 30 and provided with holes or pockets 32 that normally are open and which, consequently, are ordinarily full of sugar. The sugar discharging operation consists in moving the bar 31 from approximately its position illustrated in Figs. 4 and 7, toward the right, Fig. 7, until the pockets 32 are brought under short plates 33, respectively, and into register with discharge ports 34 lying immediately under the respective plates 33. The body of sugar held in each pocket 32 immediately drops through the port 24 into the chute 28 which guides it into its respective mold, the plates 33 closing the pockets 32 to the entrance of additional sugar from the hopper. Immediately thereafter the bar 31 is returned to its normal position, as illustrated in Fig. 7, where its pockets again are filled with sugar from the hopper. The quantity of sugar thus delivered to each mold is determined by the dimensions of the pockets 32.

The next feeding movement of the conveyor carries the bar from the station A to an idle position, and the next movement after that advances the bar to the station B, Fig. 3. Between these stations there is a short drop in each track 25 which allows the plungers 22 of the molds to fall to a lower position preparatory to receiving the cores of chewing gum. While this stepping down movement of the plunger thus produced is not always necessary, it is of advantage in the event that it is desired, for any reason, to deliver an over-supply of sugar to the molds at the first station and to use the idle position between the stations A and B to scrape off any surplus so delivered, thus ensuring the complete filling of each mold.

At the latter station a core of chewing gum 2 is deposited in each mold by a gum feeding mechanism of a novel form. It comprises a hopper 35, Fig. 1, from which three chutes, indicated at 36, Fig. 2, lead, the details of construction of each chute being substantially like that illustrated in Fig. 5. The chewing gum centers or disks 2 rest, one on another, in an edge to edge relationship in the chute, the lowermost disk resting on a stop 37 which is secured rigidly to the lower end of the chute. Fulcrumed to this part of the chute on the screw 38 is a gate 40 which straddles the chute and has an actuating arm 41 projecting rearwardly therefrom and rigid therewith. The gate includes a guide piece 42 secured rigidly to it and provided with an upright wall which is spaced from the front wall of the gate by a distance sufficient to receive a disk 2 loosely. Consequently, when the arm 41 is swung downwardly, it rocks the whole gate 40 in a counter-clockwise direction, Fig. 5, around the axis of the screw 38 and thus carries the lowermost disk 2 toward the right, pushing the disk off the end of the stop 37. It drops on to two curved fingers 43 which guide it downwardly and forwardly into the mold positioned in cooperative relationship to it. As the gate is moved toward the right in the manner just described, a horizontal guard plate 44, integral with the guide piece 42, swings forward with the gate under the second disk in the chute and supports this disk and the entire line of disks above it while the lowermost disk is being ejected. Immediately after this discharging operation the gate 40 is returned to its normal position by means of the spring 45, whereupon the line of disks in the chute drops until the disk previously held back by the guard 44 rests on the stop 37.

For the purpose of actuating simultaneously the gates 40 of the three chutes 36, a rock shaft 46, Figs. 1 and 4, extends horizontally across the conveyor and has three arms secured to it, one for each gate. One of these arms is indicated in Figs. 1 and 4 at 47, and it is provided with a pin 48 which overlies the actuating arm 41 for the gate 40, as shown in Fig. 3. Consequently, when the rock shaft 46 is swung toward the right, Fig. 1, the pin 48 bears on the arm 47 and forces this arm downwardly, thus operating the gate 40 in the manner above described, it being understood that each gate is operated by similar arms and pins. In order to rock the shaft 46 at the desired times in each cycle of operations of the machine, an arm 50, Figs. 1 and 4, is secured rigidly to the rock shaft 46, and projects upwardly into a position immediately beside a block or lug 51 which is secured to and projects laterally from the side of a bar 52 that extends longitudinally of the machine at one side thereof. The upright arm 53, Fig. 1, of a bell crank lever, fulcrumed on the machine frame at 54, and so associated with the compressing mechanism as to be operated thereby, is operatively connected with the bar 52 and serves to reciprocate this bar longitudinally of itself. Consequently, when the bar is moved to the right, Fig. 4, it operates all three of the gates 40 simultaneously. The bar 52 is also connected through a bell crank lever 55, Fig. 4, to the sliding bar 31 in the sugar hopper 30, and operates the sugar discharging means simultaneously with the operation of the core discharging mechanisms.

It is desirable to keep the chutes 36 substantially filled with chewing gum centers at all times, and for this purpose the bottom of the hopper 35 is inclined, and a portion of this bottom consists of the inclined upper surface of a reciprocating bar 56, Figs. 1 and 2. An oppositely inclined baffle plate 57, Fig. 1, has its lower edge spaced from the upper surface of the bar 56 by a distance sufficient to permit the cores 2 to pass under the baffle plate when the cores are resting flat-wise on the bar, but prevents them from passing in any other position. The movement of the bar tends to work the disks into this flat-wise position, at which time they can slide under the bar and through openings 58 which lead directly into the upper ends of the respective chutes 36. As soon as any chute is filled the entrance of additional disks to it is, of course, prevented. The operating mechanism for the bar 56 comprises a disk 60 secured rigidly to the upper end of a vertical shaft 61 and provided with an eccentric pin 62 which is connected by a link 63 with a pivot pin or bolt 64, Fig. 2, threaded into the lower side of the bar 56. The shaft 61 is driven by a bevel gear connection 65, Fig. 1, with a horizontal shaft 66, which, in turn, is driven by sprocket and chain connections with the main shaft 21.

After the molds in any bar have received the first charge of sugar and the chewing gum center 2, the bar is next moved to the station C, Fig. 3, where an additional charge of sugar is deposited in each mold by a mechanism like that at the station A, this mechanism being operated from the bar 52 through a bell crank lever 68, in exactly the same way that the first sugar discharging means is operated. The parts of this mechanism corresponding to those previously described are designated by the same, but primed, numerals. Immediately before a mold bar arrives in the position C, the plungers of its molds drop slightly on the rails 25 to provide room in the mold for the new charge of sugar.

It will be clear from the foregoing that when a mold bar moves away from the station C, each mold in it contains a chewing gum center with a layer of sugar above it and another below it. This bar may next be delivered to the compressing mechanism at the station E. Usually, however, it is preferable to equip the machine with a mechanism for centering the chewing gum disks in their respective molds, although this is not always necessary. Such a mechanism is provided at station D. Referring to Fig. 9 it will be seen that this mechanism comprises a sleeve 70, slidable in a stationary support 71, the sleeve being provided with three or more depending fingers 72. A coiled spring 73 resting on the support 71 and bearing against the lower side of a head 74 on the sleeve 70 normally holds the sleeve and the fingers in a raised position where they are above the path of travel of the bars 12. Slidable centrally in the sleeve 70 is a plunger 75 with a cross pin 76 fixed in it and guided in slots in the sleeve, and a spring 77 acts on said pin in a direction tending to hold the plunger down. The compressing mechanism includes a cross head 78, and an arm 80 rigidly secured to this cross head projects laterally from it in position to bear on the head 74. Consequently, when the compressing mechanism is operated and the cross head descends, the arm 80 will force the sleeve 70 downwardly, thus causing the flexible fingers 72 to slide inside the mold at the station D and move the chewing gum disk 2 laterally in the mold into substantially a centered position with reference to it, providing, of course, it is out of such a position. The plunger 75 strikes the material in the mold slightly in advance of the entrance of the fingers 72 into the mold, and it is held by the spring 77 lightly against this material while the fingers perform their centering function, and until after the fingers are moved out of the mold, thus avoiding any danger of the centering fingers picking up the chewing gum center and removing it from the mold. The same operation is performed in each mold of any bar at station D.

The bar next is moved to station E where the assemblies of chewing gum and sugar in the respective molds are compressed. The compressing mechanism comprises the cross-head 78, previously mentioned, mounted to reciprocate in vertical guideways provided in the machine frame, and having cam rolls 81—81, Fig. 2, projecting from its opposite ends into the internal cam paths of two cams 82—82, respectively. One of these cams is illustrated in Fig. 6. The cam at the left-hand side, Fig. 2, of the machine, is secured rigidly to the gear 18, previously mentioned, while the opposite cam is similarly secured to another gear 18'. Both of these gears with their cams are mounted to revolve on the opposite end portions of a heavy stationary shaft 83 that extends entirely across the machine from one side to the other and assists materially in giving the necessary strength to this part of the frame, the gear 18' being driven by a pinion 20' on the opposite end of the main shaft 21 from the pinion 20. Immediately after each mold bar has been moved into cooperative relationship to the compressing mechanism, the cross-head 78 is lowered by the cams 82—82 to perform the compressing operation, or at least one step in this operation. The cross-head carries a series of plungers 84, Figs. 2, 3 and 8, adapted to enter the respective molds in the successive bars 12 as these bars are brought into compressing position. In addition to these plungers the cross-head 78 also carries two pilot pins 85—85, rigidly mounted in the cross-head and having lower bevelled ends that project substantially below the lower ends of the plungers 84. These pilot pins are adapted to enter holes 86—86 drilled in the end portions of each bar 12 and they serve to center the bar accurately with the plungers 84 preparatory to the compressing step. As the cross-head is moved downwardly by the cams, the plungers 84 compress the powdered sugar in the respective molds and so consolidate this material that the sugar is formed into a very hard shell completely enclosing the respective chewing gum centers 2. During this operation the plungers 22 in the respective molds rest on a bar 89, mounted in a plurality of collars 87, which are supported on the stationary shaft 83, the collars being in line with the respective tracks 25 and forming, in effect, elements of the tracks on which the plungers 22 are guided.

For the purpose of adjusting the pressure applied to the molded material by the plungers, I prefer to introduce a yielding element between the cross-head and each plunger. As best shown in Figs. 2 and 8, this result is accomplished by providing each plunger with an integral collar 88 and locating this collar in a bore 90 drilled into the upper side of the cross-head. A coiled spring 91 is located in this bore and bears on the collar 88, the same construction being used with each plunger. Bearing on the upper ends of all three of the springs 91 is a bar 92 which is secured adjustably to the cross-head by several bolts 93. Consequently, as the cross-head moves down during the compressing stroke, its movement is transmitted through the springs 91 to the respective plungers 84, and the degree of pressure required to unseat any collar 88 may be adjusted by turning the bolts 93 in or out, as desired. Such an arrangement is of advantage not only in providing for the adjustment of the pressure used in the compressing operation, but also affords protection against breaking in the event that a double charge of material is delivered to a mold, or some foreign material gets into it.

If for any reason it is desirable to apply to the plungers a greater degree of pressure than that afforded by the compressing mechanism just described, an additional shaft 94 may be mounted horizontally above the cross-head where it will support several cams 95 so positioned as to bear directly on the upper ends of the respective plungers 84, the shaft being equipped with a gear 96, Figs. 1 and 2, which meshes with the gear 18 and is driven thereby. By properly designing the cams 95, they may be made to engage the upper ends of the plungers 84 after these plungers have been operated by the cross-head, and while the latter is at practically the lower limit of its stroke. The cams thus act positively on the plungers to force them downwardly and cause them to apply an added positive pressure to the material in the molds. This pressure, of course, results in giving the cross-head a slight additional downward movement, and the cams 82—82 should be designed to provide for such movement, it being understood that the total movement so imparted to the plungers 84 by this additional mechanism is relatively small, say, for example, one-sixteenth of an inch.

As the mold bar 12 in which the material has just been compressed is carried away from the compressing station E, its plungers 22 ride on to a rise in the rails or tracks, thus lifting the compressed tablet in each mold to the upper end of the mold. Upon the next forward movement of the conveyor chain this mold bar swings around the forward sprockets 13—13 and the compressed tablets drop out by gravity.

As the molds are carried backward on the lower return run of the conveyor, they are guided on rails 98—98, Figs. 3 and 7, at opposite sides of the machine. Similar rails 99—99 guide the bars on their forward run. Preferably each bar is equipped with a wear piece 100 to run on the latter rails.

If it is desired to impress or emboss a name, initial, symbol, or trade-mark on the tablet, this can readily be done by properly engraving the work engaging faces of the plungers 84. Such an initial or trade-mark is shown in Fig. 10 at 4.

It should be noted that the cams 82—82 not only operate the cross-head 78 of the compressing mechanism, but that they also actuate the sugar delivering means at the stations A and C, the gum discharging device at the station B, and the centering means at the station D. The connections between the cross-head and the centering mechanism have been described above. Referring to Fig. 1 it will be seen that a bar 101 is secured rigidly to a part of the cross-head and projects backwardly therefrom. This bar carries a pin 102 that normally rests in a slot in the lever or link 103 which is pivoted at 104 to the bell crank lever 53, previously referred to. As the cross-head 78 is lowered in making its compressing stroke, it operates through the lever 103 to rock the bell crank lever 53 toward the right, Fig. 1, and thus to move the bar 52 in the same direction, such movement resulting in discharging sugar from both the hoppers 30 and 30' and gum from the gates 40. A very simple operating mechanism for the devices located at the respective stations thus is provided. In addition, these connections can be thrown out of action whenever desired simply by swinging the lever 103 toward the left, Fig. 1, far enough to disengage it from the pin 102. The connections are all positive so that when the machine has once been properly timed, it is extremely reliable in operation.

Under some circumstances it is desirable to stack the tablets after the manufacturing operations on them have been completed. This is of advantage, for example, in transferring the tablets to certain types of wrapping machines, and it is particularly desirable when the manufacturer wishes to have his trade-mark embossed or impressed on the tablets and desires to have the tablets all face in the same direction in the package. This object can be conveniently realized in the machine shown by locating a stacker at the station immediately following the compressing station. While a great variety of mechanisms can be provided to perform the stacking operation, a novel arrangement is illustrated in Figs. 13 to 16. It comprises a stationary stacker base 105 mounted substantially in line with the station at the left of the compressing station E, Fig. 15. Supported in this base are three stacker tubes 106 in line, respectively, with the molds in the mold bars 12. Each tube is designed to receive loosely a vertical column or stack of tablets 3. In order to prevent the stack from dropping, each tube is equipped with a pair of spring pressed fingers 107 fitting in vertical slots formed in the lower end portions of the tube 106 so that they bear against opposite edges of those tablets in the lower portion of the stock and yieldingly resist any movement of these tablets downwardly, the pressure so applied to them being sufficient to enable them to support the line of tablets resting on them.

In order to transfer the tablets from the molds to the stacks, the forward end portions of the tracks 25 are so designed that they will lift the plungers 22 of the molds in successive bars high enough to force each tablet 3 completely out of its mold. It rests in the concaved upper end of the plunger 22. While it is held in this position, the movement of the conveyor carries the bar forward substantially into line with the stacker tubes 106, each tablet sliding into a slot 108 formed in the lower side of the bar to receive it. However, when this stacking mechanism is to be used, each mold bar is equipped with a series of wedges 110, one of which is best shown in Fig. 16, each of these wedges being welded on, or otherwise rigidly secured to, the bar immediately in front of its respective mold. Consequently, as the bar 12 is moved forward into line with the stacker, each wedge 110 slides under the stack of tablets in its respective tube, and lifts them far enough to make room for the tablet which lies immediately behind it. It is followed closely by the tablet, the latter, however, being stopped by the front wall of the tube 106 which projects down very close to the upper surface of the bar 12, as shown in Fig. 15, while the rearward edge of the tube is spaced considerably above the bar. A notch or slot 112, Fig. 16, is formed in the lower forward edge of the tube to permit the passage of the wedge 110 therethrough. This movement deposits the tablet within the grip of the lower ends of the fingers 107 so that when the bar 12 moves forward again, each tablet which it carried is left behind within the grip of the spring pressed fingers at the lower ends of the respective tubes 106. The operations above described are repeated in each tube with the arrival of each successive bar, each stack of tablets being lifted by a wedge 110 and another tablet being carried into the bottom of the stack immediately behind the wedge. The tablets are removed by hand from the top of the tubes 106 from time to time, the tubes being slotted, as shown at 14, to permit such removal.

When the stacker is not used it is desirable to locate a bar 120, Fig. 3, immediately below the level of the ends of the plungers 22 where it will serve to dislodge any tablet that may stick to one of the plungers. This occurs only rarely, but the bar 120 serves to prevent a jam in such an event.

It will now be evident that the machine provided by this invention performs automatically the several functions required in manufacturing a chewing gum confection of the character above described, it being necessary simply to keep the machine supplied with raw material and to take away the finished product. It therefore requires relatively little labor but has an exceptionally high rate of production. While it is contemplated that the machine may be used in the manufacture of a variety of other products of the compressed or tablet type, it is of particular advantage in making chewing gum tablets, both because of its high rate of production, and more especially due to the fact that it makes a product in which the chewing gum center is completely encased in a shell of hard amorphous sugar, so consolidated that it is relatively impervious to the passage of air and therefore provides an exceptionally effective protection for the core of chewing gum. This product, therefore, avoids the rapid ageing which is one of the serious objections to the more common method of preparing chewing gum for the retail trade. Also, since the sugar is in a non-crystalline or amorphous condition, it also avoids the objection to the other form in which chewing gum has heretofore been marketed, as above described. In addition, it effects a substantial economy in the preparation of this material for the market. This same economy can also be realized in the manufacture of other products which can be made in machines having the essential features of this invention.

While I have herein shown and described a preferred embodiment of my invention, it will be evident that the invention is susceptible of embodiment in other forms without departing from the spirit or scope thereof. Also, that the machine can be used to advantage in the manufacture of other products for which it is adapted.

Having thus described my invention, what I desire to claim as new is:

1. In a machine of the character described, the combination of a mold, mechanism for moving said mold along a predetermined path, a plurality of mechanisms spaced along said path and operative, respectively, to deliver charges of sugar and a core of chewing gum to said mold at predetermined points in its travel, additional means for approximately centering the core laterally in the body of sugar in the mold after all of said charges have been delivered to the mold, and mechanism for compressing each assembly of chewing gum and sugar so produced.

2. In a machine of the character described, the combination of a conveyor, a series of mold bars carried by said conveyor, each of said bars having a plurality of mold cavities in it, operating mechanism for said conveyor, mechanisms for depositing charges of different confection forming materials into each mold cavity as said bars are moved through the machine, and mechanism to which said bars are presented successively for compressing simultaneously the material in all of the cavities of each individual bar to produce a hard consolidated confection; said compressing mechanism including a plurality of plungers, one for each mold of an individual bar, said plungers being adapted to enter the upper ends of the mold cavities, a reciprocating cross-head in which said plungers are mounted, and mechanism for operating said cross-head to give said plungers their compressing movement.

3. In a machine of the character described, the combination of a conveyor, a series of mold bars carried by said conveyor, each of said bars having a plurality of mold cavities in it, operating mechanism for said conveyor, mechanisms for depositing charges of different confection forming materials into each mold cavity as said bars are moved through the machine, and mechanism to which said bars are presented successively for compressing simultaneously the material in all of the cavities of each individual bar to produce a hard consolidated confection; said compressing mechanism including a plurality of plungers, one for each mold of an individual bar, said plungers being adapted to enter the upper ends of the mold cavities, a reciprocating cross-head in which said plungers are mounted, mechanism for operating said cross-head to give said plungers their compressing movement, and springs through which the motion of said cross-head is transmitted to the respective plungers.

4. In a machine of the character described, the combination of a conveyor, a series of mold bars carried by said conveyor, each of said bars having a plurality of mold cavities in it, operating mechanism for said conveyor, mechanisms for depositing charges of different confection forming materials into each mold cavity as said bars are moved through the machine, and mechanism to which said bars are presented successively for compressing simultaneously the material in all of the cavities of each individual bar to produce a hard consolidated confection; said compressing mechanism comprising means for applying a yielding pressure to the material in said molds, and additional means for positively compressing said material.

5. In a machine of the character described, the combination of a conveyor, a series of mold bars carried by said conveyor, each of said bars having a plurality of mold cavities in it, operating mechanism for said conveyor, mechanisms for depositing charges of different confection forming materials into each mold cavity as said bars are moved through the machine, and mechanism to which said bars are presented successively for compressing simultaneously the material in all of the cavities of each individual bar to produce a hard consolidated confection; said compressing mechanism including a plurality of plungers, one for each mold of an individual bar, said plungers being adapted to enter the upper ends of the mold cavities, a reciprocating cross-head in which said plungers are mounted, mechanism for operating said cross-head to give said plungers their compressing movement, springs through which the motion of said cross-head is transmitted to the respective plungers, and power driven means for acting directly on said plungers to apply additional pressure through them to the materials to be molded.

6. In a machine of the character described, the combination of a conveyor, a series of mold bars carried by said conveyor, each of said bars having a plurality of mold cavities in it, operating mechanism for said conveyor, mechanisms for depositing charges of different confection forming materials into each mold cavity as said bars are moved through the machine, one of said charges consisting of a formed body of confection material, and mechanism to which said bars are presented successively for compressing simultaneously the material in all of the cavities of each individual bar to produce a hard consolidated confection, and means for centering said formed bodies laterally in their respective molds prior to the compressing operation.

7. In a machine of the character described, the combination of a conveyor, a series of mold bars carried by said conveyor, a plurality of mold cavities in each bar, movable bottom plungers in said cavities, one for each cavity, a track along which said plungers travel with said bars, mechanism for operating said conveyor to cause it to carry said bars successively past a plurality of stations, means at one of said stations for depositing measured charges of powdered sugar into the respective cavities in each bar, means at another station for delivering a core of chewing gum into each cavity of the respective bars, and mechanism for simultaneously compressing the assemblies of sugar and chewing gum in the cavities of each bar at another station.

8. In a machine of the character described, the combination of a conveyor, a series of molds carried by said conveyor, mechanism for moving said conveyor to carry said molds successively past a plurality of stations, means at one of said stations for delivering a core of chewing gum into each of said molds as they are brought into cooperative relationship to it, mechanisms at stations preceding and following that at which the core is delivered for depositing measured quantities of sugar in each of said molds, mechanism for compressing each assembly of chewing gum and sugar in the successive molds, and means for approximately centering the core laterally in each mold after said charges of sugar have been delivered to it and preparatory to compressing the assembly in it.

9. In a machine of the character described, the combination of a conveyor, a series of mold bars carried by said conveyor, each of said bars having a mold cavity in it, mechanism for moving said conveyor to carry said molds successively past a plurality of stations, means at one of said stations for delivering a core of chewing gum into each of said mold cavities as they are brought successively into cooperative relationship to it, means at the stations preceding and following that at which the core is delivered for measuring quantities of powdered sugar and delivering them to the respective mold cavities, means for approximately centering the core laterally in each mold cavity, mechanism for thereafter compressing each assembly of chewing gum and sugar in the successive molds to produce a hard consolidated confection of predetermined shape, each of said molds including a plunger slidable in the mold cavity, and a track along which said plungers of successive molds are guided as the mold bars are moved through the machine by the conveyor.

10. In a machine of the character described, the combination of a mold, mechanism for moving said mold along a predetermined path, a plurality of mechanisms spaced along said path and operative, respectively, to deliver charges of sugar and a core of chewing gum to said mold at predetermined points in its travel, additional means for approximately centering the core laterally relatively to the body of sugar in the mold, comprising elements for entering the cavity in the mold and means for moving said elements into positions between the wall of said cavity and said core, and mechanism for compressing each such assembly of chewing gum and sugar after the core has been so centered.

11. In a machine of the character described, the combination of a mold, mechanism for moving said mold along a predetermined path, a plurality of mechanisms spaced along said path and operative, respectively, to deliver charges of sugar and a core of chewing gum to said mold at predetermined points in its travel, mechanism for compressing each such assembly of chewing gum and sugar, and additional means for centering each core laterally relatively to the body of sugar in the mold preparatory to said compressing operation, comprising a plurality of centering fingers for entering the cavity in the mold, means for moving said fingers into positions between the walls of the mold and said core, and a device for depressing the core during said centering operation.

12. In a machine of the character described, the combination of a conveyor, a series of mold bars carried by said conveyor, a plurality of mold cavities in each bar, movable bottom plungers in said cavities, one for each cavity, a track along which said plungers travel with said bars, mechansim for operating said conveyor to cause it to carry said bars successively past a plurality of stations, means at one of said stations for depositing a core of chewing gum into each cavity of the respective bars as the bars are brought successively into cooperative relationship to said means, mechanisms at stations preceding and following that at which the core is delivered for delivering measured quantities of powdered sugar to the respective mold cavities, mechanism at another station for simultaneously compressing the assemblies of chewing gum and sugar in the cavities of each respective bar, and additional means for approximately centering the cores laterally in each respective mold cavity, comprising centering fingers and means for forcing said fingers into the cavities and into positions between the wall of each cavity and the core therein.

13. In a machine of the character described, the combination of a flexible conveyor, a series of mold bars secured to and carried by said conveyor, each of said bars having a mold cavity in it, mechanism for moving said conveyor to carry said mold bars successively past a plurality of stations, mechanism at said stations for delivering charges of confection forming materials into said mold cavities, each of said molds including a plunger slidable in its mold cavity, a track along which said plungers of successive mold bars are guided and on which the plungers are operatively supported in different elevations at the respective stations as the bars are moved through the machine by the conveyor, and means for compressing the material in each cavity to produce a hard consolidated confection of predetermined shape.

14. In a machine of the character described, the combination of a mold, mechanism for moving said mold along a predetermined path, a plurality of mechanisms spaced along said path and operative, respectively, to deliver charges of sugar and a core of chewing gum to said mold at predetermined points in its travel, said mold including a movable bottom plunger, a cam track on which said plunger rests and along which it is moved into different elevations at predetermined points in the path of travel of the mold, mechanism for compressing successive assemblies of chewing gum and sugar in the mold to produce hard consolidated tablets, a stacker for receiving said tablets, and means cooperating with said stacker and the molds to utilize the movement of translation of the mold to transfer the tablets from the mold into the stacker.

15. In a machine of the character described, the combination of a mold, mechanism for moving said mold along a predetermined path, a plurality of mechanisms spaced along said path and operative, respectively, to deliver charges of sugar and a core of chewing gum to said mold at predetermined points in its travel, said mold including a movable bottom plunger, a cam track on which said plunger rests and along which it is moved into different elevations at predetermined points in the path of travel of the mold, mechanism for compressing successive assemblies of chewing gum and sugar in the mold to produce hard consolidated tablets, and a stacker to which the tablets are delivered by the movement of the mold, said cam track being constructed to elevate the mold plunger in timed relationship to said delivering movement of the mold to raise the tablet in the mold to the desired point for delivery into the stacker.

16. A machine according to preceding claim 9, in combination with a stacker positioned to receive successive confections from said molds, the track being constructed to raise the plunger sufficiently after the compressing operation to elevate the completed confection into position for delivery to the stacker, and means for elevating the preceding confections in the stacker preparatory to the delivery of each new confection thereto.

17. A machine according to preceding claim 9, in combination with a stacker positioned to receive successive confections from said molds, the track being constructed to raise the plunger sufficiently after the compressing operation to elevate the completed confection into position for delivery to the stacker, and means carried by said mold bars for elevating the preceding confections in the stack preparatory to the delivery thereto of the next succeeding confection.

18. In a machine of the character described, the combination of a conveyor, a series of mold bars carried by said conveyor, each of said bars having a plurality of mold cavities in it, mechanism for operating said conveyor to cause it to carry said bars successively past a plurality of stations, means at one of said stations for depositing a core of chewing gum in each cavity of the respective mold bars as they are brought successively into cooperative relationship to said means, means at stations preceding and following that at which the core is so deposited for delivering measured quantities of powdered sugar to the respective mold cavities, and power driven mechanism to which said bars are presented successively for compressing simultaneously the material in all of the cavities of each individual bar to produce a hard consolidated confection.

19. In a machine of the character described, the combination of a conveyor, a series of mold bars carried by said conveyor, each of said bars having a plurality of mold cavities in it, movable bottom plungers in said cavities, one for each cavity, mechanism for operating said conveyor to cause it to carry said bars successively past a plurality of stations, means at one of said stations, for depositing a core of chewing gum in each cavity of the respective bars as they are brought successively into cooperative relationship to said means, means at stations preceding and following that at which the core is so deposited for delivering measured quantities of powdered sugar to the respective mold cavities, mechanism at a subsequent station for simultaneously compressing the assemblies of sugar and chewing gum in the cavities of each bar, and means for moving said plungers in their cavities at points in their path of travel with the conveyor.

CONRAD E. PETERSON.